United States Patent
Wang et al.

(10) Patent No.: US 10,782,201 B2
(45) Date of Patent: Sep. 22, 2020

(54) CENTER OF GRAVITY OFFSET DETECTION METHOD AND PLATFORM SCALE

(71) Applicants: Mettler-Toledo (Changzhou) Measurement Technology Co. Ltd, Changzhou, Jiangsu (CN); Mettler-Toledo (Changzhou) Precision Instrument Co. Ltd, Changzhou, Jiangsu (CN); Mettler-Toledo International Trading (Shanghai) Co. Ltd, Shanghai (CN)

(72) Inventors: ZhiQiang Wang, Changzhou (CN); YiWen Ge, Changzhou (CN); GenJun Ji, Changzhou (CN); ShaoWen Zheng, Changzhou (CN); Douglas Bliss, Worthington, OH (US)

(73) Assignees: Mettler-Toledo (Changzhou) Measurement Technology Co. Ltd, Changzhou, Jiangsu (CN); Mettler-Toledo (Changzhou) Precision Instrument Co. Ltd, Changzhou, Jiangsu (CN); Mettler-Toledo International Trading (Shanghai) Co. Ltd, Shanghai (CN)

(*) Notice: Subject to any disclaimer, the term of this patent is extended or adjusted under 35 U.S.C. 154(b) by 223 days.

(21) Appl. No.: 15/989,682

(22) Filed: May 25, 2018

(65) Prior Publication Data
US 2018/0340856 A1    Nov. 29, 2018

(30) Foreign Application Priority Data
May 26, 2017    (CN) .......................... 2017 1 0389041

(51) Int. Cl.
*G01M 1/12*    (2006.01)
*G01G 23/01*    (2006.01)
(Continued)

(52) U.S. Cl.
CPC ............ *G01M 1/122* (2013.01); *G01G 21/22* (2013.01); *G01G 23/002* (2013.01); *G01G 23/01* (2013.01); *G01G 23/18* (2013.01); *G01M 1/12* (2013.01)

(58) Field of Classification Search
CPC ...... G01M 1/122; G01M 1/12; G01G 23/002; G01G 23/18; G01G 21/22; G01G 23/01; G01G 23/00
(Continued)

(56) References Cited

U.S. PATENT DOCUMENTS 5,750,937 A    5/1998    Johnson et al.
7,100,439 B2    9/2006    Carlucci
(Continued)

FOREIGN PATENT DOCUMENTS

CN    104596621 A    *    5/2015
CN    104596621 A        5/2015

*Primary Examiner* — Marrit Eyassu
(74) *Attorney, Agent, or Firm* — Standley Law Group LLP; Jeffrey S. Standley; Stephen L. Grant (57) ABSTRACT

A platform scale uses a method of detecting a center-of-gravity (COG) offset. A weight value of a load on a weighing platform is calculated. The weighing platform is allowed to reach a steady state. When the weight value exceeds a COG offset threshold, then a position of a load COG is calculated using a load COG position algorithm. Whether the calculated position is in a valid region of the weighing platform is determined. The weight value is displayed if the position is within the valid region; otherwise, the position of the COG is displayed. A display apparatus of the scale displays the weight value or the position of COG of the load. The platform scale alerts a user about a possible invalid weighing event by displaying an image indicative of the COG offset condition, ensuring effective and precise weighing.

14 Claims, 3 Drawing Sheets

(51) Int. Cl.
*G01G 23/00* (2006.01)
*G01G 21/22* (2006.01)
*G01G 23/18* (2006.01)

(58) Field of Classification Search
USPC .......................................................... 177/1
See application file for complete search history.

(56) References Cited

U.S. PATENT DOCUMENTS

| | | | |
|---|---|---|---|
| 7,126,065 B2 | 10/2006 | Petrucelli | |
| 7,202,424 B2 | 4/2007 | Carlucci | |
| 7,253,366 B2* | 8/2007 | Bhai | A61B 5/1115 |
| | | | 177/144 |
| 8,921,717 B2* | 12/2014 | Siegel | G01G 23/18 |
| | | | 177/144 |
| 9,939,309 B2 | 4/2018 | Withings | |
| 2015/0160068 A1* | 6/2015 | Carreel | G01G 3/1404 |
| | | | 177/1 |
| 2016/0078740 A1* | 3/2016 | Pirio | A61B 5/6892 |
| | | | 340/573.4 |

* cited by examiner

CENTER OF GRAVITY OFFSET DETECTION METHOD AND PLATFORM SCALE

CROSS-REFERENCE TO RELATED APPLICATIONS

This application claims priority to Chinese patent application 201710389041.8, filed on 26 May 2017, which is incorporated by reference as if fully recited herein.

TECHNICAL FIELD

The invention relates to measuring weights and more particularly to a center-of-gravity offset detection method used in a platform scale.

BACKGROUND

At present, with the extensive application of digital weighing platforms, when the center-of-gravity of an object to be weighed is offset from the center of a weighing plate, namely, a center-of-gravity offset phenomenon, the weight value becomes invalid. Thus, center-of-gravity offset is a serious phenomenon that results in the failure to obtain effective and precise weight value. Ensuring effective weighing, especially during a manual weighing operation is the primary problem associated with prior art platform scales.

A scale for measuring the weight of an object, particularly the weight of a human being, by taking into account the center of gravity of the object placed on the scale's weight supporting surface is disclosed through patent publications U.S. Pat. Nos. 7,100,439 and 7,202,424. This scale has an inherent limitation in that it attempts to detect the center of gravity offset condition in all weighing events for all objects that it weighs irrespective of how much those objects weigh. In specific commercial and industrial applications where platform scales are used for weighing objects of varying weight values, it is not necessary to obtain high precise weight values for loads that fall below a threshold weight value. Any guidance to the user of the scale to adjust the position of these unworthy loads for overcoming a center-of-gravity offset condition is counter-productive and will only waste valuable operational time. Secondly, the prior art scale offers only a fixed size of the zone on its supporting surface where the load is expected to be located. Lack of flexibility seriously impairs and limits the prior art scale's applications in a variety of environments. Also, the prior art scale is not capable of showing the center of gravity position of the load relative to the scale's center of gravity position where the load is expected to be located.

A method that provides instantaneous weight and weight position relative to a neutral plane and which data is used for providing an alarm whenever the weight distribution approaches a pre-set boundary is disclosed in patent publications U.S. Pat. No. 8,921,717. This method is used in the context of a patient lying on a hospital bed. When the patient shifts her weight towards the edge, the caretakers will be alerted instantly for immediate attention. The output on the display contains the weight of the object (patient), the longitudinal position, and the lateral position of the object. This method has a drawback because the weight and weight position are displayed simultaneously i.e. there exists no dependency on the weight and the position of the weight. In addition, the pre-set boundary is not subject to adjustment or change in order to suit the dimensional characteristics of the object.

The technical problem to be solved by the present invention is to overcome the defects in the prior art devices where effective weighing and precision are affected due to the center-of-gravity offset of a platform scale especially in a platform scale involving manual weighing. Provided in the instant invention is a center-of-gravity offset detection method. The present invention also comprises a platform scale, which can alert by way of displaying to the user the situation of invalid weighing, and can also enable, by means of prompting, the dynamic adjustment of the degree of offset from the center-of-gravity during manual weighing operation, thereby ensuring effective weighing and precision thereof.

SUMMARY

The present invention provides a center-of-gravity offset detection method for a platform scale. The method comprising the steps of: calculating a weight value of the load placed on a weighing platform of a platform scale; allowing a weighing platform to reach a steady state; determining whether the weight value exceeds a center-of-gravity offset threshold; calculating a position of a center-of-gravity of the load on the weighing platform using a load center-of-gravity position algorithm; determining whether the calculated position of the center-of-gravity of the load is in a valid region of the weighing platform; displaying the weight value when the position of the center-of-gravity of the load is within the valid region of the weighing platform; displaying the position of the center-of-gravity of the load when the position of the center-of-gravity of the load is outside the valid region of the weighing platform. The advantageous method takes in to account both the weight value of the load as well as the position of the load on the weighing platform of the platform scale.

The term 'weight value' in the context of the present invention is the weight of the load placed on the weighing platform and measured by the weighing sensors of the platform scale. The term 'center-of-gravity offset threshold' is the minimum weight value of the load that is required for the center-of-gravity offset detection method to initiate the load center-of-gravity position measurement. For a load, whose weight value is less than the center-of-gravity offset threshold no measurement of its center-of-gravity position is carried out and hence the weight value will be instantly displayed as computed by the weighing sensors. The term 'center-of-gravity offset threshold' will be explained further in detail with an example where the platform scale with a weighing capacity of 100 kg has the center-of-gravity offset threshold set at 10 kg. Consider a scenario where a load placed at an arbitrary location on the weighing platform of the scale reports a weight value of 8 kg. As the computed weight value of the load (8 kg) is less than the center-of-gravity offset threshold (10 kg), the platform scale does not undertake the step of determining the position of center-of-gravity of the load. As an advantageous feature, the center-of-gravity offset threshold is user adjustable depending on the application where the platform scale is deployed. The term 'valid region' refers to a zone on the weighing platform measured as a percentage of length and/or width of the weighing platform. For the measured weight value of the load to be valid, the load must be so positioned on the weighing platform that the position of the center of gravity of the load remains within the confines of this zone. The valid region of the weighing platform is adjustable. Particularly, the valid region can be adjusted or set as a percentage of the length and/or width of the weighing platform by the user of the weighing scale, permitting a device to operate better. Preferably, the valid region is located in the center of the weighing platform.

The present invention makes it convenient for a user to adjust the position of a load on a weighing platform by alerting the user about the load center-of-gravity position, thereby achieving effective weighing. A load center-of-gravity position algorithm in the present invention is used to calculate a projection location of the center-of-gravity of an object to be weighted on the weighing platform, and the calculation method for the center-of-gravity can be realized by using a conventional center-of-gravity algorithm known in the prior art.

Preferably, when the position is located outside the valid region of the weighing platform, an image that visualizes the position of center-of-gravity of the load is generated and displayed as output comparing it with the position of the valid region on the weighing platform. The present invention alerts the user by means of an image, the positional relationship between the center-of-gravity of the load and the valid region, thereby making it convenient for the user to adjust the center-of-gravity position of the load at a position on a weighing platform, and thus achieving effective weighing besides improving precision.

Preferably, weighing data for various weighing sensors on the weighing platform is obtained and the weight value is calculated. Increasing the number of weighing sensors increases the accuracy of the weight value of the load measured by the platform scale. In a preferred way, the platform scale comprises at least four weighing sensors. Preferably, the weighing sensors are located beneath the weighing platform and are arranged in a square or rectangular pattern, such that at least one weighing sensor is received at each of the corners of the weighing platform. More weighing sensors may be located along the edges, that is, between two adjacent corners of the weighing platform.

In the present invention, when weighing sensors are provided on the weighing platform, the weighing sensors can be arranged in a rectangle or square pattern, such that each of the edges in the rectangle or square is constituted by the weighing sensors arranged at intervals of a certain distance along the edges of the platform, and the number of weighing sensors included on each of the edges can be set as needed. However, at least two weighing sensors on each edge are necessary to form a line.

Preferably, the weighing platform is in a square or rectangular shape. Preferably, the weighing sensors are uniformly distributed at various corners or along the edges of the weighing platform. In the present invention, the weighing sensors may be uniformly distributed at the four corners of a square or rectangle, and may be spaced apart uniformly along the four edges or two symmetrical edges of the square or rectangle. However, the specific manner in which the sensors are distributed can vary with the shape of the weighing platform.

Preferably, the four corners of the weighing platform are respectively provided with a weighing sensor each. Preferably, several weighing sensors are uniformly provided along the first edge of the weighing platform, and an equal number of weighing sensors are correspondingly provided along the other edge opposite to the first edge.

Preferably, calculating the position of the center-of-gravity of a load on the weighing platform using a load center-of-gravity position algorithm comprises: establishing a coordinate system, comprising an x-axis and a y-axis, on the weighing platform, such that the coordinates of the various weighing sensors along the x-axis of the weighing platform are respectively (k1, 0), (k2, 0), ... (ki, 0) ... (kn, 0), where n≥2, kn=a and k1=0, and the coordinates of the various weighing sensors along the y-axis thereof are (g1, b), (g2, b), ... (gj, b) ... (gn, b), where gn=a, and g1=0. Therefore, the coordinate point (k1, g1) forms the origin of the coordinate system defined by the respective axes. The farthest point (kn, 0) along the x-axis where a sensor is located is at a distance "a" from the origin. The farthest point (gn, 0) along the y-axis where a sensor is located is at a distance "b" from the origin. When the weighing platform has a square shape, of course, "a" and "b" are equal. An ordered pair (X,Y) on the plane using the same coordinate system formed by the respective axes defines the position of the center of gravity of the load. The x-y plane is arranged horizontally.

The calculation formula for the abscissa X of the center-of-gravity in the coordinate system is as follows:

$$X = \left(\sum_{j=1}^{n} W_j g_j + \sum_{i=1}^{n} W_i k_i\right) \bigg/ \left(\sum_{i=1}^{n} W_i + \sum_{j=1}^{n} W_j\right)$$

The calculation formula for the ordinate Y of the center-of-gravity in the coordinate system is as follows:

$$Y = b \sum_{j=1}^{n} W_j \bigg/ \left(\sum_{i=1}^{n} W_i + \sum_{j=1}^{n} W_j\right)$$

where Wj is a weight value generated by the weighing sensor at the coordinates (gj, b), and Wi is a weight value generated by the weighing sensor at the coordinates (ki, 0).

Determining whether the position of the center-of-gravity of the load on the weighing platform is in the valid region of the weighing platform comprises: determining whether the abscissa X of the center-of-gravity is in an interval ((0.5−OKZ/2)*a, (0.5+OKZ/2)*a)), and also determining whether the ordinate Y of the center-of-gravity is in an interval ((0.5−OKZ/2)*b, (0.5+OKZ/2)*b), where OKZ is a pre-set percentage of the range of the valid region.

The above-mentioned center-of-gravity calculation algorithm and the valid region determination method can rapidly carryout data processing, and thus can realize rapid response and real-time data output.

The present invention also provides a platform scale, characterized in that the platform scale comprises a weighing platform and a display apparatus and uses a center-of-gravity offset detection method as described above. The display apparatus displays the weight value or the position of the center-of-gravity of the load on the weighing platform.

In the present invention, the platform scale improves by means of a center-of-gravity offset detection method, effective weighing and weighing precision during manual weighing.

The advantageous effect of the present invention lies in the fact that the center-of-gravity offset detection method in the present invention can check, according to a set value, whether weighing is effective during manual weighing, then alert a user whether the weighing is invalid weighing, and visually display a gravity-center position and an effective range at the same time, thereby improving the user experience.

In addition, the visual alerting of an invalid weighing situation also makes it possible to further adjust the position of the center-of-gravity of a load manually during manual weighing, thereby ensuring effective weighing and precision thereof.

BRIEF DESCRIPTION OF THE DRAWINGS

The center-of-gravity offset detection method and a platform scale according to the invention will be described hereinafter through embodiments shown schematically in the drawings, wherein.

DETAILED DESCRIPTION OF THE DRAWINGS

The present invention is further illustrated below by way of exemplary embodiments, but the embodiments do not thus limit the scope of the invention.

The center-of-gravity offset detection method in the present invention comprises: reading a force-bearing value for each weighing sensor when a weighing platform receives a load; then calculating the position of the center-of-gravity of an object to be weighted using a load gravity-of-center algorithm; then comparing and setting a valid region; and generating a picture intuitively displaying a positional relationship between the center-of-gravity of the load and the valid region from relevant information such as the center-of-gravity and the valid region in the manner of a coordinate system having an x-axis and a y-axis arranged in a horizontal plane, and then alerting a user about the specific situation of invalid weighing by displaying an image on a display of the platform scale.

Figure 1:
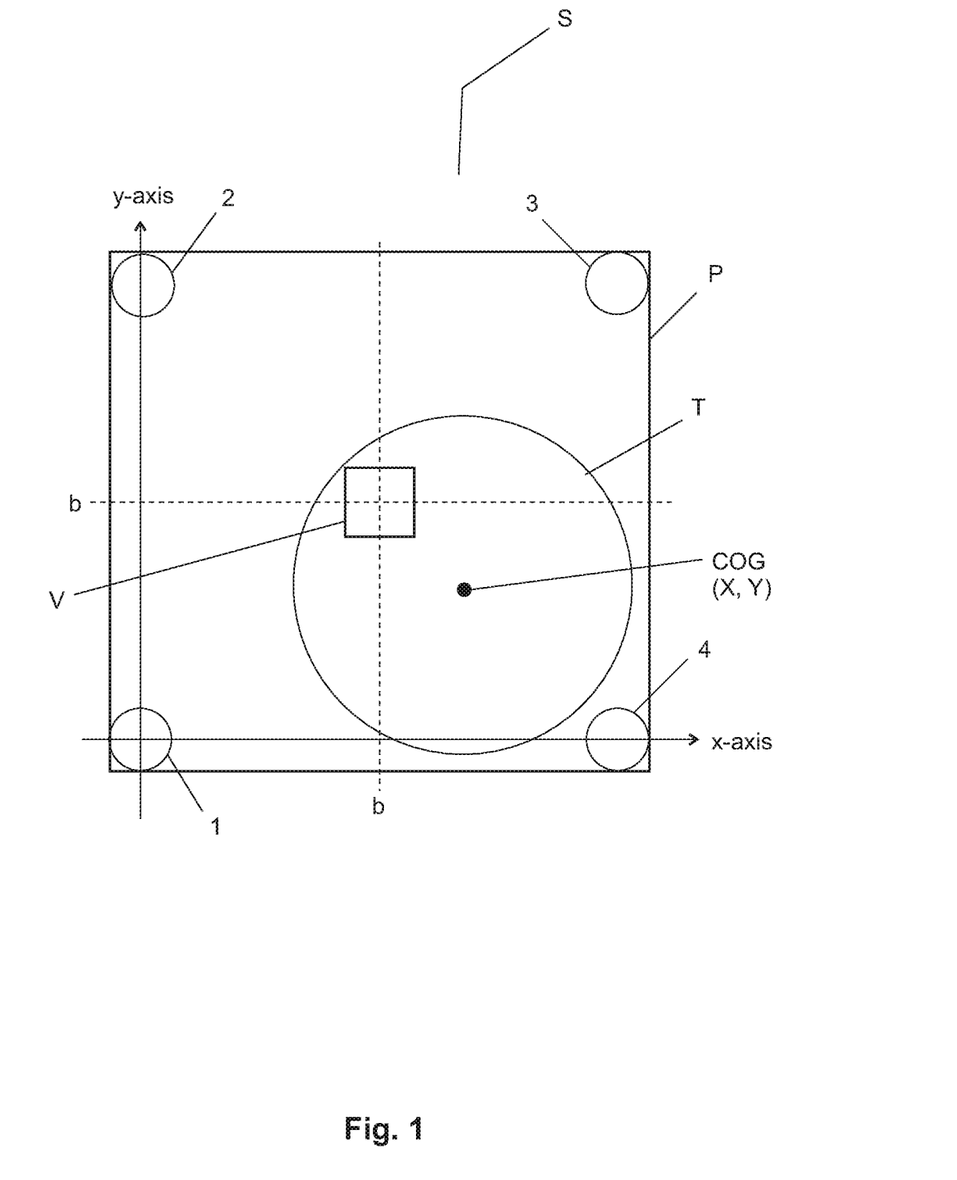
FIG. 1 is a schematic top plan view of a weighing platform according to one embodiment of the present invention.

By way of the embodiments described below, the implementations of the present invention are illustrated by way of examples. Hereinafter one embodiment of the invention will be explained in detail with reference to FIG. 1. As shown in FIG. 1, a platform scale S in this embodiment comprises a square weighing platform P, wherein the four corners of the weighing platform P are all respectively provided with a weighing sensor, namely the weighing sensors identified by 1, 2, 3 and 4 at the four corners of the square weighing platform P. Particularly, the weighing sensors 1, 2, 3, 4 are located beneath the weighing platform, where they are arranged to constitute a square pattern. The platform scale further comprises a display screen (not shown in the drawings).

Figure 2:
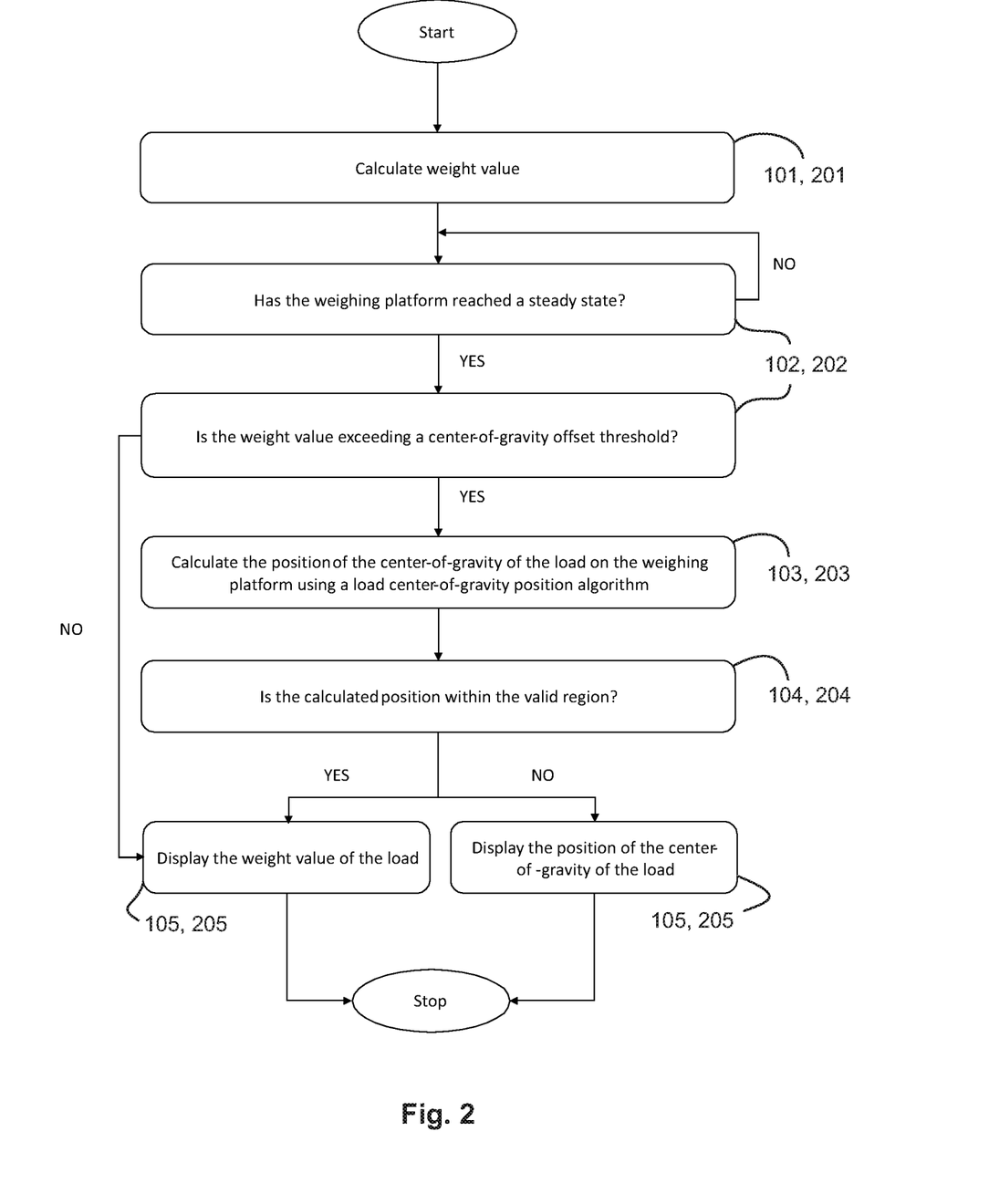
FIG. 2 is a flow diagram showing the steps involved in executing the center-of-gravity offset detection method.

The weighing process of the platform scale S in this embodiment after a load T is placed on the weighing platform P will hereinafter be explained by referring to FIG. 2. Step 101: collecting, by the weighing platform P, force-bearing values of the four weighing sensors 1, 2, 3 and 4, and calculating a weight value. Step 102: waiting for the weighing platform P to reach a steady state, and if the weight value does not exceed a center-of-gravity offset threshold at this time, outputting and displaying on the display screen a weight value for the weighing platform P when the weighing platform P has attained a steady state, and the platform scale S waiting for the next weighing operation; and if the weight value exceeds the center-of-gravity offset threshold at this time, executing step 103. The center-of-gravity offset threshold can be set as different values according to the weighing capability of the platform scale S, and a specific value needs to be selected by the user operating the weighing platform, according to practical requirements. Step 103: calculating the position of the center-of-gravity (COG) of the load T on the weighing platform, firstly by establishing a coordinate system on the weighing platform P, wherein the weighing sensor marked as 1 is set as the origin; upwards from the plane is the y-axis, and rightwards from the plane forms the x-axis; and the coordinates of the center-of-gravity (COG) of the load in the figure are represented by (x, y) such that the distances between the weighing sensor marked as 1 and the weighing sensors marked as 2 and 4 are both 'b'; then, acquiring force-bearing values of the weighing sensors, wherein the force-bearing values of the four weighing sensors 1, 2, 3, and 4 are respectively W1, W2, W3 and W4 in that order; and thereafter, obtaining, by means of calculation, an X coordinate of the center-of-gravity (COG) of the load T using the formula X=(W3+W4)*b/(W1+W2+W3+W4), and obtaining, by means of calculation, a Y coordinate of the center-of-gravity (COG) of the load T using the formula Y=(W2+W3)*b/(W1+W2+W3+W4). Step 104: determining whether the center-of-gravity (COG) of the load T is in a valid region V of the weighing platform P.

The coordinates (b/2, b/2) of the center of the weighing platform P are determined first, and an effective range is determined using an effective range percentage (OKZ, OK Zone), wherein the specific data of OKZ can be set according to the weighing capacity of the platform scale S. For example, the OKZ can be set as 20% of the length and/or width of the weighing platform P originating from the center of the weighing platform P. In this embodiment, the effective range is V as shown in FIG. 1. The terms "effective range" and "valid region" both indicate the same item on the weighing platform P and the terms are used interchangeably. Valid region V is preferably located in the center of the weighing platform P.

In the present embodiment, the weighing platform P is of a square shape. Therefore, the final effective range V is also of a square shape, which is consistent with the shape of the weighing platform P. In another embodiment, the effective range may also be of a rectangular shape etc. Hence, the shape and selection of the effective range of the weighing platform P are not to be construed as limitations while determining the scope of this invention.

The coordinates (X, y) of the center-of-gravity (COG) is obtained by calculation involved in step 103. Step 104: When the center-of-gravity (COG) satisfy the following four conditions at the same time, it can be considered that the center-of-gravity (COG) of the load T is within the effective range V. Otherwise the center-of-gravity (COG) of the load T is beyond the effective range V.

$$X > (0.5 - OKZ/2)*b \text{ and } X < (0.5 + OKZ/2)*b$$

$$Y > (0.5 - OKZ/2)*b \text{ and } Y < (0.5 + OKZ/2)*b$$

Step 105: if it is determined in step 104 that the center-of-gravity (COG) is in the valid region V of the weighing platform P, displaying the weight value of the load T as an output on a display screen when the weighing platform reaches a steady state. When the center-of-gravity (COG) of load T is located outside the valid region V of the weighing platform P, which is indicative of invalid weighing, generating images of the center-of-gravity (COG) and the valid region V according to the positions thereof in the coordinate system and outputting the images via the display screen, so as to alert the user of invalid weighing and center-of-gravity offset state.

As long as the images generated in this embodiment can intuitively prompt the user about the positional relationship between the center-of-gravity (COG) of the load T and the valid region V of the platform scale S, it is expedient to directly output the schematic diagram shown in FIG. 1. It is also possible to output an enhanced graphical interface that is aesthetically appealing to the user of the platform scale S. This embodiment in no way intends to limit the specific content and form of images shown on the display screen of the platform scale S.

Figure 3:
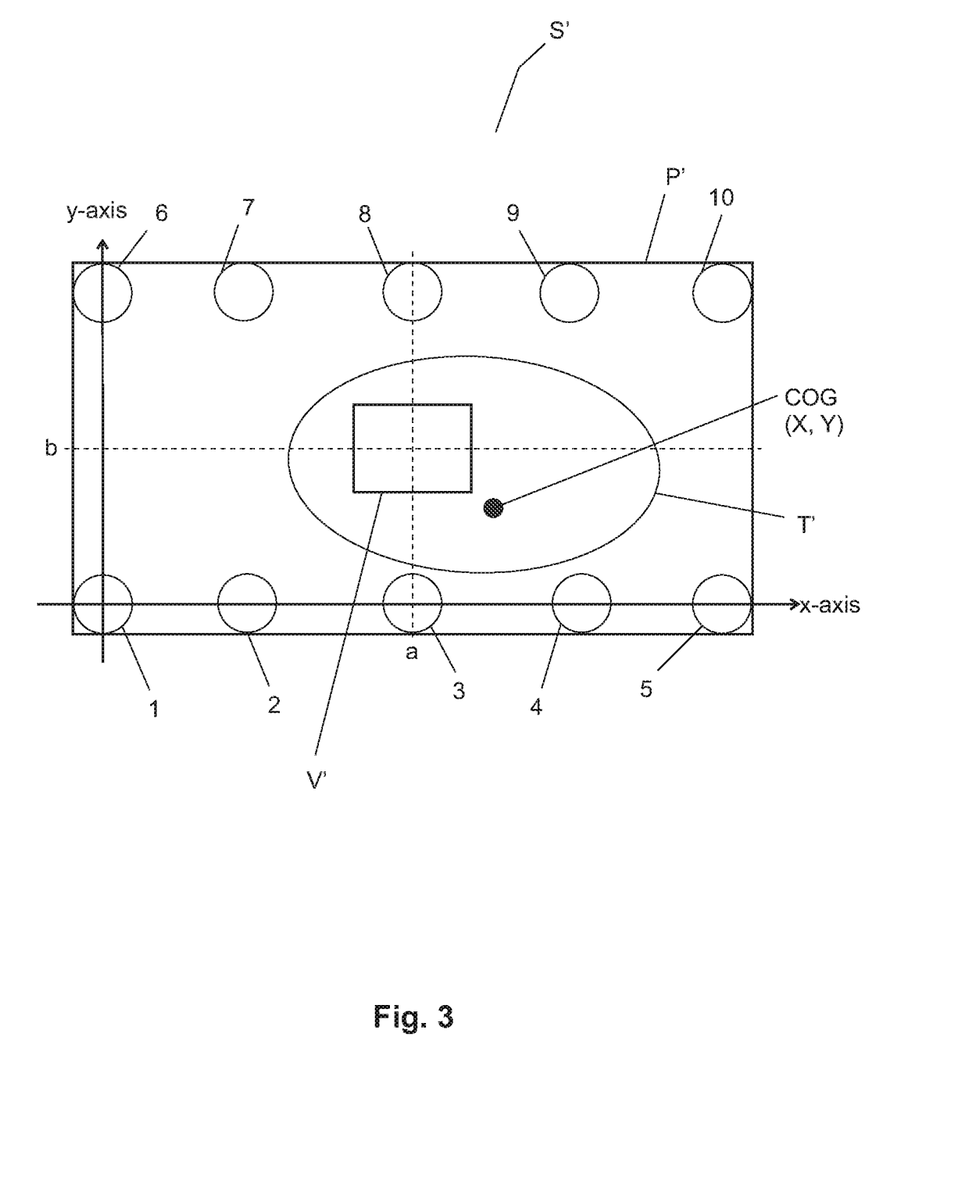
FIG. 3 is a schematic top plan view of a weighing platform according to another embodiment of the present invention.

Another embodiment of the invention will be explained in detail with reference to FIG. 3, where the difference between the platform scale S' in this embodiment and the platform scale S in the preceding embodiment lies in that the weighing platform P' of the platform scale S' in this embodiment is rectangular in shape, and ten weighing sensors (1-10) are uniformly and symmetrically arranged along the edges of the weighing platform P', particularly along the edge designated as the x-axis and the edge parallel to that x-axis as shown in FIG. 3. More specifically, the weighing sensors 6, 7, 8, 9 and 10 are arranged serially along the edge of the weighing platform P' spatially positioned parallel to the x-axis and the weighing sensors 1, 2, 3, 4 and 5 are arranged serially along the edge of the weighing platform P' designated as the x-axis of the plane as shown in FIG. 3.

In an alternative arrangement within the same embodiment, the center-of-gravity offset measuring method in the present invention can also be realized by uniformly and symmetrically arranging ten weighing sensors along the edge designated as the y-axis of the plane and along the edge parallel to the y-axis of the plane of the weighing scale shown in FIG. 3. In another alternative arrangement of this embodiment, ten weighing sensors (1-10) can be uniformly and symmetrically arranged along the weighing platform edges, that is, along the x-axis, the y-axis and their respective parallel axes of the platform scale S' shown in FIG. 3, that is to say, the four corners of the weighing platform P' are respectively provided with one weighing sensor each, with two weighing sensors being further symmetrically provided on the x-axis and the edge parallel thereto, and one weighing sensor each being further symmetrically provided on the y-axis and the edge parallel thereto.

Therefore, the number and manner of arrangement of the weighing sensors provided in the weighing platform P' can be selected according to requirements, and these alternative arrangements are not intended to limit the number and manner of arrangement of the weighing sensors on the weighing platform P'. The process of weighing a load T' using the platform scale S' of the present embodiment after a load T' is placed on the weighing platform P' will hereinafter be explained with reference once again to FIG. 2. Step 201: the weighing platform P' collecting force-bearing values of the ten weighing sensors (1-10) and calculating a weight value. Step 202: waiting for the weighing platform P' to reach a steady state, and if the weight value does not exceed a center-of-gravity offset threshold at this time, outputting and displaying, on a display screen, a weight value of the load T', while the weighing platform P' reaching the steady state, and the platform scale S' waiting for the next weighing operation; and if the weight value exceeds the center-of-gravity offset threshold at this time, executing step 203. Step 203: calculating the position of the center-of-gravity (COG) of the load T' on the weighing platform P', which comprises: firstly, establishing a coordinate system on the weighing platform P', wherein the weighing sensor marked as 1 is set as origin; vertically from the origin is set as the y-axis; rightward from the origin is set as the x-axis, and the coordinates of the center-of-gravity (COG) of the load T' in FIG. 3 are represented by (X, Y), such that the distance between the weighing sensor marked as 1 and the weighing sensor marked as 6 is 'b', and the distance between the weighing sensor marked as 1 and the weighing sensor marked as 5 is 'a'; then determining the coordinates of various weighing sensors i.e. the coordinates of five sensors 1, 2, 3, 4, and 5 on the x-axis of the plane are (k1, 0), (k2, 0), (k3, 0), (k4, 0) and (k5, 0), where k5=a, and k1=0, and the coordinates of five sensors 6, 7, 8, 9, and 10 on the edge parallel thereto of the plane are (g1, b), (g2, b), (g3, b), (g4, b) and (g5, b), where g5=a, and g1=0; then acquiring force-bearing values W1, W2, W3, W4, W5, W6, W7, W8, W9 and W10 of all the ten corresponding weighing sensors 1-10, and thereafter, obtaining, by means of calculation, an X coordinate of the center-of-gravity (COG) from the formula $$X=(W2*k2+W3*k3+W4*k4+W5*k5+W7*g2+W8*g3+W9*g4+W10*g5)/(W1+W2+W3+W4+W5+W6+W7+W8+W9+W10),$$

and obtaining, by means of calculation, a Y coordinate of the center-of-gravity (COG) from the formula $$Y=(W6+W7+W8+W9+W10)*b/(W1+W2+W3+W4+W5+W6+W7+W8+W9+W10).$$

In this embodiment, there are a total of ten weighing sensors 1-10 on the x-axis and the edge parallel thereto, and if the area of the weighing platform P' for the platform scale S' is relatively large so that more weighing sensors can be configured, the coordinates X and Y of the center-of-gravity (COG) can be calculated from the general formula known in the prior art. The coordinates of various weighing sensors arranged along the x-axis of the plane of the weighing scale S' are respectively (k1, 0), (k2, 0), . . . (ki, 0) . . . (kn, 0), where n≥2, kn=a and k1=0. The coordinates of various weighing sensors 1-10 arranged on the edge parallel to the x-axis of the plane of the weighing scale S' are (g1, b), (g2, b), . . . (gj, b) . . . (gn, b), where gn=a, and g1=0.

The calculation formula for a value X of the center-of-gravity (COG) of the load T' in the coordinate system is as follows:

$$X = \left(\sum_{j=1}^{n} W_j g_j + \sum_{i=1}^{n} W_i k_i\right) \bigg/ \left(\sum_{i=1}^{n} W_i + \sum_{j=1}^{n} W_j\right)$$

where Wj is a weight value generated by the weighing sensor at the coordinates (gj, b), and Wi is a weight value generated by the weighing sensor at the coordinates (ki, 0).

The calculation formula for a value Y of the center-of-gravity (COG) of the load T' in the coordinate system is as follows:

$$Y = b \sum_{j=1}^{n} W_j \bigg/ \left(\sum_{i=1}^{n} W_i + \sum_{j=1}^{n} W_j\right)$$

In addition, in another variant, the center-of-gravity can also be calculated by using other types of existing algorithms such as weighted summation calculation. It must be noted that the use of a particular algorithm for calculating the center-of-gravity of the load T' is in no way intended to limit the scope of this invention.

Step 204: determining whether the center-of-gravity (COG) of the load is in a valid region V' of the weighing platform P'. The coordinates (b/2, b/2) of the center-of-gravity (COG) of the weighing platform P' are determined first, and an effective range V' is determined using an effective range percentage (OKZ, OK region), for example by setting OKZ as 15%, etc. In this embodiment, the effective range is indicated by V' as shown in FIG. 3. The coordinates (X, Y) of the center-of-gravity (COG) is obtained by means of calculation in step 203, and when the center-of-gravity satisfy the following four conditions simultaneously, it can be inferred that the center-of-gravity (COG) of the load T' is within the effective range V', otherwise the center-of-gravity (COG) of load T' is beyond the effective range.

$X>(0.5-OKZ/2)*a$ and $X<(0.5+OKZ/2)*a$ $Y>(0.5-OKZ/2)*b$ and $Y<(0.5+OKZ/2)*b$.

Step 205: if it is determined, in step 204, that the center-of-gravity (COG) is in the valid region V' of the weighing platform P', outputting and displaying on a display screen a weight value of the load T' as the weighing platform P' reaching a steady state. When the center-of-gravity (COG) is located outside the valid region V' of the weighing platform P', which indicates invalid weighing, generating images of the center-of-gravity (COG) and the valid region V' according to the positions thereof in the coordinate system and outputting the images via the display screen so as to alert the user about invalid weighing and center-of-gravity offset state.

While the particular embodiments of the present invention have been described above, a person skilled in the art should understand that these are merely illustrative, and that the scope of protection of the present invention is defined by the appended claims. A person skilled in the art can make various alterations or modifications to these embodiments without departing from the principle and essence of the present invention; however, all of these alterations and modifications fall within the scope of protection of the present invention.

What is claimed is:

1. A method for detecting a center-of-gravity ("COG") offset in a platform scale having a load placed on a weighing platform thereof, the method comprising the steps of:
measuring a weight vale of the load from each of a plurality of 2n weighing sensors, with n sensors arranged on a first edge of the weighing platform and n sensors arranged on an opposing edge;
calculating a weight value of the load from the measured weight value;
allowing the weighing platform to reach a steady state;
determining whether the weight value meets or exceeds a COG offset threshold;
calculating, using an algorithm implemented on the platform scale, a load COG position on the weighing platform of a COG of the load, the algorithm comprising the steps of:
establishing a coordinate system for the plurality of 2n weighing sensors, such that the sensors on the first edge have the coordinates (k1, 0), (k2, 0), . . . (ki, 0) . . . (kn, 0), where n≥2, kn=a and k1=0, and the sensors on the opposing edge have the coordinates (g1, b), (g2, b), . . . (gj, b) . . . (gn, b), where gn=a, and g1=0, wherein a and b are, respectively, the distances between two farthest apart weighing sensors on two adjacent edges of the weighing platform;
calculating the value X of the COG in the coordinate system using the formula:

$$X = \left(\sum_{j=1}^{n} W_j g_j + \sum_{i=1}^{n} W_i k_i\right) \bigg/ \left(\sum_{i=1}^{n} W_i + \sum_{j=1}^{n} W_j\right)$$

and
calculating the value Y of the COG in the coordinate system using the formula:

$$Y = b \sum_{j=1}^{n} W_j \bigg/ \left(\sum_{i=1}^{n} W_i + \sum_{j=1}^{n} W_j\right)$$

where Wj is a weight value generated by the weighing sensor at the coordinates (gj, b), and Wi is a weight value generated by the weighing sensor at the coordinates (ki, 0);
determining whether the calculated load COG position is in a valid region of the weighing platform; and
if the calculated load COG position is within the valid region, then displaying the calculated weight value; otherwise, displaying the calculated load COG position.

2. The method of claim 1, wherein the valid region of the weighing platform is adjustable.

3. The method of claim 2, wherein the valid region of the weighing platform is adjustable as a percentage of the length, the width or both the length and the width of the weighing platform.

4. The method of claim 3, wherein the center-of-gravity offset threshold is adjustable.

5. The method of claim 1, wherein the step of displaying the calculated load COG position comprises the substeps of:
generating an image representative of the calculated load COG; and
displaying the image on a display apparatus of the of the platform scale.

6. The method of claim 1, wherein:
the plurality of weighing sensors is arranged in a square or rectangular pattern on the weighing platform.

7. The method of claim 1, wherein:
the weighing platform is in a square or rectangular shape.

8. The method of claim 1, wherein:
the plurality of weighing sensors is arranged uniformly on corners or along edges of the weighing platform.

9. The method of claim 1, wherein:
at least one of the plurality of weighing sensors is arranged in each of the corners of the weighing platform.

10. The method of claim 1, wherein:
the plurality of weighing sensors arranged on the first edge of the weighing platform are spaced apart uniformly, and
the plurality of weighing sensors arranged on the opposing edge of the weighing platform are spaced apart uniformly.

11. The method of claim 1, wherein the step of determining whether the calculated load COG position is in a valid region of the weighing platform is achieved by the steps of:
determining whether the value X of the COG is in an interval ((0.5−OKZ/2)*a, (0.5+OKZ/2)*a); and determining whether the value Y of the COG is in an interval $((0.5-OKZ/2)*b, 0.5+OKZ/2)*b)$, where OKZ is a predetermined percentage of the range of the valid region.

12. A platform scale, comprising:
- a weighing platform having a plurality of 2n weighing sensors, with n sensors arranged on a first edge of the weighing platform and n sensors arranged on an opposing edge;
- a display apparatus; and
- a controller, programmed to implement an instruction set to perform the following:
    - measure a weight value of the load from the plurality of 2n weighing sensors;
    - calculate a weight value of the load from the measured weight value;
    - allow the weighing platform to reach a steady state;
    - determining whether the weight value meets or exceeds a COG offset threshold;
    - calculating, using the algorithm of claim 1, a load COG position on the weighing platform of a COG of the load;
    - determine whether the calculated load COG position is in a valid region of the weighing platform; and
    - it the calculated load COG position is within the valid region, instructing the display apparatus to displaying the calculated weight value; or
    - if the calculated load COG position is not within the valid region, instructing the display apparatus to display the calculated load COG position.

13. The method of claim 1, wherein the valid region of the weighing platform is adjustable as a percentage of the length, the width or both the length and the width of the weighing platform.

14. The method of claim 1, wherein the center-of-gravity offset threshold is adjustable.

\* \* \* \* \*